April 2, 1946.  W. R. ZIMMERMAN  2,397,901
APPARATUS FOR MEASURING MOLTEN METAL TEMPERATURES
Filed Sept. 2, 1942  2 Sheets—Sheet 1
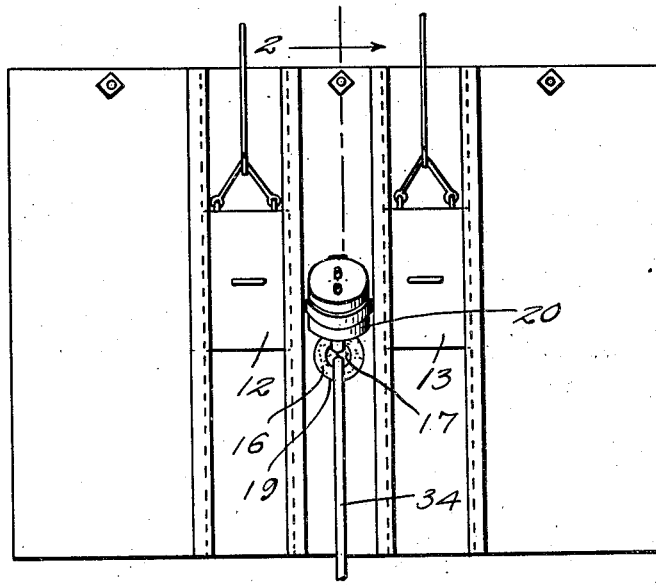
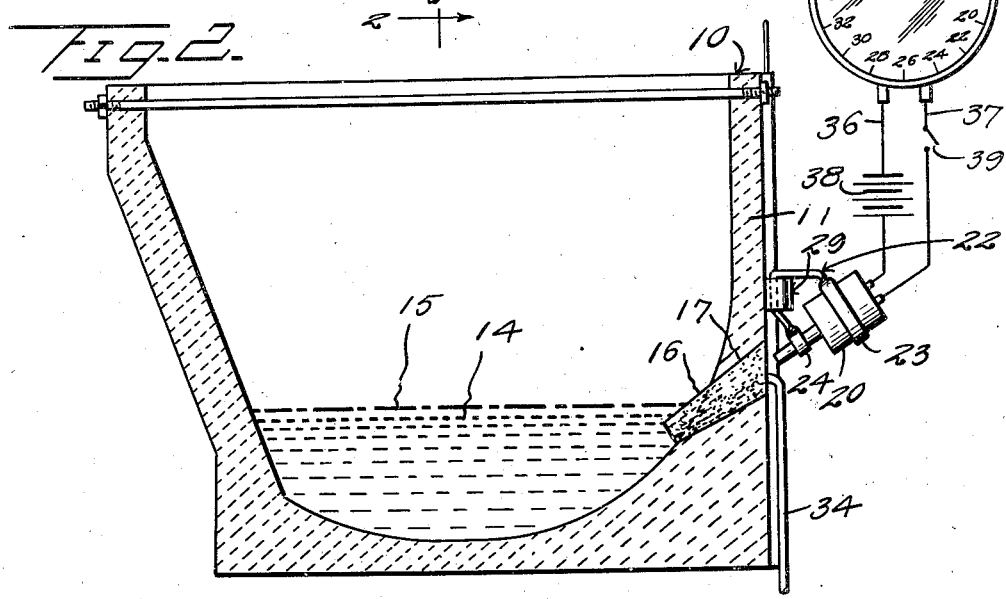
Inventor
W. R. Zimmerman
By Kimmel & Crowell
Attorneys April 2, 1946.   W. R. ZIMMERMAN   2,397,901
APPARATUS FOR MEASURING MOLTEN METAL TEMPERATURES
Filed Sept. 2, 1942   2 Sheets-Sheet 2
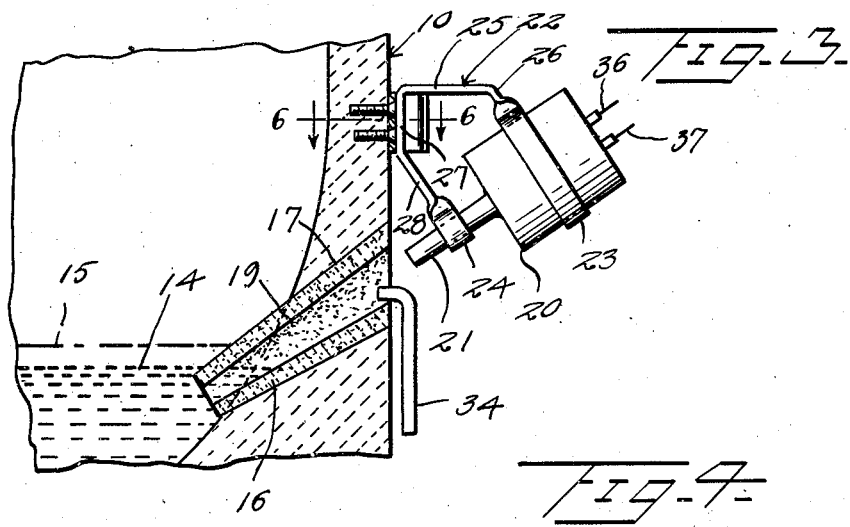
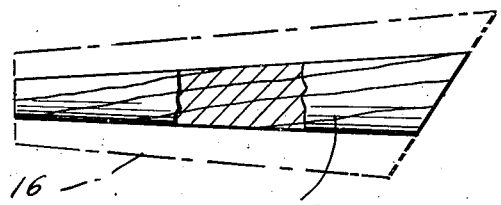
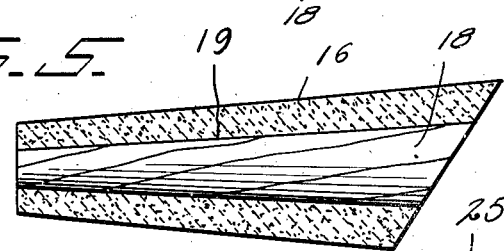
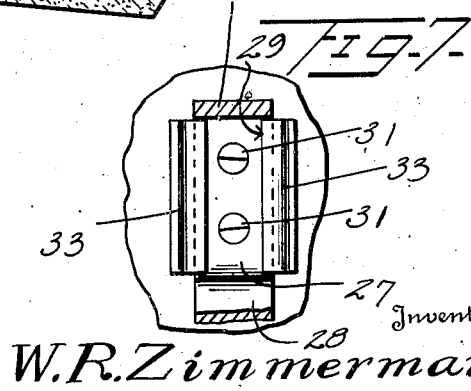
Inventor
W. R. Zimmerman
By Kimmel & Crowell
Attorneys

Patented Apr. 2, 1946

2,397,901

UNITED STATES PATENT OFFICE 2,397,901

APPARATUS FOR MEASURING MOLTEN METAL TEMPERATURES

William R. Zimmerman, Hubbard, Ohio

Application September 2, 1942, Serial No. 457,092

1 Claim. (Cl. 88—22.5)

This invention relates to apparatus for measuring high temperatures, particularly temperatures occurring in the metal bath of an open hearth furnace during refining or processing of the molten metal.

Metallurgists have long realized the importance of temperature control of the metal bath in an open hearth furnace, especially during the later or refining period of the heat. The temperature of the metal has a direct influence on the final chemical analysis and on the amount of scrap or rejected steel in the finished product.

At the present, the temperature is determined by the observation and judgment of the melter. Temperature readings taken while the steel is being tapped from the furnace into the ladle are too late for any beneficial changes to be made. This device would enable the furnace operator to obtain an accurate and continuous temperature during the important refining period of the heat of steel.

In the past various methods and devices have been employed for determining the temperatures of the molten metal, and while prior methods and devices would, for a short time, record the temperatures, such prior methods and devices were not entirely satisfactory because of the fact that where a part of the device is projected into the furnace it is subjected to the high temperature and frequently breaks off during the cleaning of the furnace or the charging of the same. It is, therefore, an object of this invention to provide a temperature recording apparatus wherein the sensitive receiver is disposed exteriorly of the furnace so that no part thereof is in direct contact with the molten metal or projected into the furnace.

A further object of this invention is to provide a sighting tube which is open at each end so that the sensitive apparatus, in the form of a pyrometer, will receive light radiation emanating directly from the metal disposed at the inner end of the tube.

With the foregoing and other objects in view, as may hereinafter more fully appear, the invention consists of the novel construction, combination and arrangement of parts, as will be more specifically referred to and as illustrated in the accompanying drawings, wherein are shown several embodiments of the invention, but it is to be understood that changes, variations, and modifications may be resorted to which fall within the scope of the invention, as claimed.

In the drawings:

Figure 1 is a detail front elevation of a furnace having a temperature indicating means constructed according to this invention mounted thereon;

Figure 2 is a sectional view, taken on the line 2—2 of Figure 1, and showing diagrammatically a recorder connected with the device;

Figure 3 is an enlarged vertical section through the furnace showing the mounting of the device thereon;

Figure 4 is a side elevation, partly broken away, and in section, showing the first step in the method of preparing the refractory tube for mounting in the furnace;

Figure 5 is a longitudinal section through the refractory tube with the plug or core disposed therein;

Figure 6 is a sectional view taken on the line 6—6 of Figure 3; and

Figure 7 is a sectional view taken on the line 7—7 of Figure 6.

Referring to the drawings, the numeral 10 designates generally a furnace, such as a conventional open hearth furnace construction having a vertical front wall 11 provided with doors 12 and 13. The furnace 10 is adapted to have molten metal disposed therein, the level of the metal being indicated by the numeral 14, and the slag on top of the metal being indicated by the numeral 15.

In order to provide a means whereby the temperature of the molten metal 14 may be readily determined and recorded during the entire time of the processing of the metal, I have provided a hollow, substantially conical tube 16, which is mounted in an opening 17 provided in the front wall 11 of the furnace 10. The opening 17 extends downwardly and inwardly so that the lower end of the opening 17 will be disposed below the level 14 of the molten metal, and the upper or outer end of the opening 17 will be disposed above the level of the metal 14 and also above the level of the slag 15. The tubular member 16 is preferably constructed of initially plastic chrome ore, graphite and the like, taken either singly or in combination, or is constructed of other suitable refractory material which can be formed within the opening 17. The tubular member 16 constitutes a sight tube for sighting the light emanating from the molten metal and in the formation of the tubular member 16, a wooden plug or core 18 is disposed in the opening 17 and is of a size substantially less in diameter than the diameter of the opening 17 so that the plastic refractory material may be placed about the plug or core 18 and then packed in position, within the opening 17.

After the refractory material 16 has set or hardened, the plug 18 may be forced outwardly so that an opening 19 will be provided on the interior of the refractory insert 16.

A pyrometer 20 is disposed on the exterior of the furnace 10 and is of a character embodying the use of a light sensitive cell, and includes a sight tube 21 which is open at its forward end and is disposed coaxially with the axis of the hollow refractory member 16. The forward or lower end of the sight tube 21 is disposed in slightly spaced relation outwardly from the outer end of the refractory member 16, but in a position whereby the light rays emanating from the glowing metal, will enter the tube 21 and act upon the light cell forming part of the pyrometer 20.

The pyrometer 20 is supported from the furnace 10 by means of a bracket, generally designated as 22. This bracket 22 includes a loop 23 engaging about the body of the pyrometer 20 and a second similar loop 24 engaging about the sight tube or light guiding member 21. The large loop or ring 23 is formed integral with a horizontal supporting arm 25, which is provided at its outer end with an obtusely disposed extension 26. The inner end of the arm 25 has formed integral therewith a vertical supporting base 27 and the lower end of the supporting base 27 has formed integral therewith downwardly and outwardly inclined arm 28 to which the supporting loop 24 is secured.

The bracket structure 22 is adapted to be detachably supported from the furnace 10, by means of a spring clip, generally designated as 29. The clip 29 includes a base 30 which may be secured by fastening means 31 to the outer side of the front wall 11 of the furnace and a pair of forwardly extending arms 32 are formed integral with the opposite vertical edges of the base 30. A pair of transversely arcuate clamping members 33 are formed integral with the forwardly extending arms 32 so that the base 27 may be pushed inwardly thereby spreading the clamping arms 33 until the base 27 engages behind the rear ends of the arms 33 and is disposed between the forward extending portions 32. The lower side of the rear or inner end of the upper supporting arm 25 is adapted to engage the upper edges of the clamping members 33 so as to prevent the downward movement of the bracket structure when in applied position.

The interior of the refractory member or tube 16 is adapted to be maintained in a substantially clean condition by means of an air tube 34. The air tube 34 is adapted to be connected to a suitable source of air pressure supply and air under pressure is projected into the bore 19 of the refractory member 16. In this manner the dirt, including dust, light slag or the like, will be forced out of the bore 19 so that this dust or dirt will not affect the passage of light rays through the light ray guiding member 21. A recording or registering instrument 35 is adapted to be disposed at a point remote from the furnace 10, and is connected with the pyrometer 20 by means of a pair of conductors 36 and 37. A battery 38 or other suitable source of electric supply may be interposed in the conductor 36 and a switch 39 may be interposed in the conductor 37.

In the use and operation of this recording structure the front wall 11 of the furnace 10 is formed with the tapered opening 17, and the hollow refractory or light guiding member 16 is molded in the opening 17 about the core member 18. The inner and outer ends of the refractory light guide member 16 are open and after the material has set the plug 18 is pushed outwardly. During the processing of the metal the light rays of the metal at the forward or inner end of the guide member 16 will pass outwardly and will enter the light ray guiding tube 21 forming a part of the pyrometer 20. The pyrometer 20 will activate the recording or registering member 35 and the air tube 34 will keep the bore 19 of the refractory member 16 clean at all times.

With a device of this kind the pyrometer 20 is not in direct contact with the metal so that the heat from the metal will not affect the pyrometer, and during the cleaning or charging of the furnace 10 no part of the pyrometer 20 will be injured, as is the case with devices of this kind which are extended through a door or other part of the furnace. When the molten metal has been discharged from the furnace and if, during the cleaning of the furnace the refractory member 16 should be damaged, this member may be easily and quickly replaced by merely inserting the core member 18 in the opening 17, and reforming the refractory member 16 thereabout. During the charging of the furnace the pyrometer 20 is preferably removed from the supporting structure 29 so that the pyrometer will not become damaged in any manner.

In the mounting of the refractory member 16 in the side of the furnace a lower or inner end of this member is preferably disposed fairly close to the level of the metal, being positioned about one or two inches below the level of the metal.

I claim:

In a furnace having a vertical front wall, said furnace adapted to have molten metal disposed therein, means whereby the temperature of the molten metal may be determined during the entire time of the processing of the metal, said means consisting of a hollow tube mounted in an opening provided in the front wall of said furnace, said opening extending downwardly and inwardly so that the lower end of the opening will be disposed below the level of the molten metal and the upper end of the opening will be disposed above the level of the metal, said tubular member constituting a sight tube for sighting the the light emanating from the molten metal, a pyrometer disposed on the exterior of the furnace comprising a light sensitized cell and including a sight tube open at its forward end and disposed coaxial with the axis of the tubular member.

WILLIAM R. ZIMMERMAN.